(12) United States Patent
Yazaki et al.

(10) Patent No.: US 10,784,927 B2
(45) Date of Patent: Sep. 22, 2020

(54) WIRELESS COMMUNICATION DEVICE

(71) Applicant: Murata Manufacturing Co., Ltd., Nagaokakyo-shi, Kyoto-fu (JP)

(72) Inventors: Hirokazu Yazaki, Nagaokakyo (JP); Noriyuki Ueki, Nagaokakyo (JP); Noboru Kato, Nagaokakyo (JP)

(73) Assignee: MURATA MANUFACTURING CO., LTD., Nagaokakyo-Shi, Kyoto-Fu (JP)

( * ) Notice: Subject to any disclaimer, the term of this patent is extended or adjusted under 35 U.S.C. 154(b) by 0 days.

(21) Appl. No.: 16/568,722

(22) Filed: Sep. 12, 2019

(65) Prior Publication Data
US 2020/0014425 A1    Jan. 9, 2020

Related U.S. Application Data

(63) Continuation of application No. PCT/JP2019/012070, filed on Mar. 22, 2019.

(30) Foreign Application Priority Data

Jul. 6, 2018  (JP) .................. 2018-129067

(51) Int. Cl.
| | |
|---|---|
| H05B 6/68 | (2006.01) |
| H04B 5/00 | (2006.01) |
| H01Q 1/02 | (2006.01) |
| H01Q 1/22 | (2006.01) |

(52) U.S. Cl.
CPC ............ *H04B 5/0062* (2013.01); *H01Q 1/02* (2013.01); *H01Q 1/2208* (2013.01); *H05B 6/687* (2013.01)

(58) Field of Classification Search
CPC ...... H04B 5/0062; H01Q 1/02; H01Q 1/2208; H05B 6/687
See application file for complete search history.

(56) References Cited

U.S. PATENT DOCUMENTS

| | | | |
|---|---|---|---|
| 2005/0130389 A1* | 6/2005 | Yamazaki | H01L 27/1214 438/455 |
| 2006/0009251 A1* | 1/2006 | Noda | H01Q 1/38 455/550.1 |

(Continued)

FOREIGN PATENT DOCUMENTS

| | | |
|---|---|---|
| JP | H1051223 A | 2/1998 |
| JP | 2000163543 A | 6/2000 |

(Continued)

OTHER PUBLICATIONS

International Search Report issued for PCT/JP2019/012070, dated May 21, 2019 (Japanese language).

*Primary Examiner* — Md K Talukder
(74) *Attorney, Agent, or Firm* — Arent Fox LLP

(57) ABSTRACT

An RFID tag is provided that transmits and receives a communication signal. The RFID tag includes a base material, antenna patterns provided on the base material, an RFIC package that is a feeding circuit connected to the antenna patterns, and an ignition protection member provided on the base material or the antenna patterns. Moreover, the ignition protection member contains moisture, such that ignition and combustion can be prevented even in a situation where the RFID tag is subjected to high-frequency power for heating a food item while attached to the food item or the like.

20 Claims, 20 Drawing Sheets

(56) References Cited

U.S. PATENT DOCUMENTS

| | | | |
|---|---|---|---|
| 2009/0071952 A1* | 3/2009 | Kuwabara | H05B 1/0233 |
| | | | 219/494 |
| 2009/0261414 A1* | 10/2009 | Oikawa | H01L 27/1266 |
| | | | 257/347 |
| 2010/0219252 A1* | 9/2010 | Kikuchi | H01Q 1/2225 |
| | | | 235/488 |
| 2010/0245206 A1* | 9/2010 | Mori | H01Q 1/38 |
| | | | 343/873 |
| 2015/0302290 A1* | 10/2015 | Saito | G06K 19/07786 |
| | | | 235/488 |
| 2016/0050750 A1* | 2/2016 | Rogers | H05K 1/0275 |
| | | | 361/767 |
| 2017/0347408 A1* | 11/2017 | Shibuya | F24C 15/327 |
| 2018/0068942 A1* | 3/2018 | Shibuya | H05K 1/0224 |
| 2018/0189623 A1* | 7/2018 | Forster | G06K 19/07771 |
| 2019/0172149 A1* | 6/2019 | Conboy | C09K 21/00 |
| 2019/0325282 A1* | 10/2019 | Forster | G06K 19/0723 |
| 2019/0387642 A1* | 12/2019 | Toleno | F28F 19/004 |
| 2020/0014425 A1* | 1/2020 | Yazaki | H04B 5/0062 |

FOREIGN PATENT DOCUMENTS

| | | | |
|---|---|---|---|
| JP | 2005242629 A | | 9/2005 |
| JP | 2006338563 A | | 12/2006 |
| JP | 2008059085 A | | 3/2008 |
| KR | 1020100102424 A | | 9/2010 |

\* cited by examiner

WIRELESS COMMUNICATION DEVICE

CROSS REFERENCE TO RELATED APPLICATIONS

The present application is a continuation of PCT/JP2019/012070 filed Mar. 22, 2019, which claims priority to Japanese Patent Application No. 2018-129067, filed Jul. 6, 2018, the entire contents of each of which are incorporated herein by reference.

TECHNICAL FIELD

The present invention relates to a wireless communication device including an antenna, and more particularly, to a wireless communication device such as an RFID (Radio Frequency Identification) tag that conducts near field communication through an induced electromagnetic field or an electromagnetic wave.

BACKGROUND

An RFID tag is a type of wireless communication device that is used in various situations because the RFID tag communicates with a reader and writer, and the reading and writing operations of predetermined information can be performed in a noncontact manner. For example, so-called self-checkout can smoothly be performed by attaching the RFID tag to all products. Additionally, management of sales and distribution conditions such as securing of traceability and marketing is smoothly performed.

On the other hand, a wide variety of products are handled in stores such as a convenience store and a supermarket, and among food items as products, there are some products that are heated immediately after the products are purchased, to be taken out, or to be immediately eaten or drunk on the spot by a purchaser. For example, a lunch box or a prepared dish can be heated at a store using an electromagnetic wave heating device, such as a microwave oven.

However, when the product to which the RFID tag is attached is heated using the microwave oven, sometimes the following problems arise.

In general, an LF band of 135 kHz or less, an HF band such as 13.56 MHz, a UHF band such as a band of 860 MHz to 960 MHz, and a microwave band such as 2.45 GHz are mainly used as a frequency of a communication signal of the RFID tag. At present, the RFID tag of the type attached to the food items is the RFID tag in which the UHF band is used. In this type of RFID tag, a metal material such as an antenna pattern that is a metal film body is provided on a base material such as paper or resin together with a Radio-Frequency Integrated Circuit (RFIC) element.

When the product to which the RFID tag is attached is heated in the microwave oven, energy of an electromagnetic wave from the microwave oven is absorbed by the RFID tag together with the product. Consequently, there is a risk that the RFID tag or a portion of the product to which the RFID tag is attached may ignite due to, for example, one or more of the following reasons:

discharge at a place where electric field strength is enhanced in the metal material;
heat generation and sublimation of the metal material due to an overcurrent flowing in the metal material; and
heat generation of the base material of the RFID tag.

In particular, since a high-power electromagnetic wave of about 3 kW is radiated inside the chamber of the microwave oven installed in the convenience store and the RFID tag is heated at once immediately after the start of heating, there is a high risk of the ignition depending on conditions.

To address such situations, a configuration of a flame-retardant tag is proposed in Literature 1 in order to reduce the risk of ignition in the RFID tag.

Patent Literature 1: Japanese Patent Unexamined Publication No. 2006-338563

The flame-retardant tag disclosed in Patent Literature 1 is one in which the base material on which an IC chip and an antenna pattern are mounted is made of a flame-retardant material. For this reason, combustion of the base material is prevented. However, the metal material provided on the base material has a high possibility of temporally continuous discharge, and no configuration that can surely prevent the risk of ignition of the base material and the possibility that the product catches fire is provided.

SUMMARY OF THE INVENTION

Accordingly, an object of the present invention is to provide a wireless communication device that can prevent ignition and combustion even in a situation in which the wireless communication device is subjected to high-frequency power for heating a food item while attached to the food item or the like.

According to one exemplary aspect of the present invention, a wireless communication device that transmits and receives a communication signal is provided that includes a base material; an antenna pattern provided on the base material; a feeding circuit electrically connected to the antenna pattern; and an application member (i.e., an ignition protection member) provided on the base material or the antenna pattern, with the application member containing moisture.

For example, when the wireless communication device having the above structure is irradiated with the microwave in the chamber of the microwave oven, each part of the wireless communication device is microwave-heated, whereas the moisture contained in the application member has the high heating efficiency, so that the moisture is rapidly heated and vaporization of the moisture changes the atmosphere around the wireless communication device. For example, temperature rise is reduced in the vicinity of the application member by heat absorption action due to heat of vaporization of water. Additionally, the microwave power is absorbed by the moisture contained in the application member and the water vapor of the moisture, thereby reducing the microwave power to which the circuit including the antenna pattern is subjected. The action of rapidly heating the moisture will be described in detail later.

According to the present invention, a wireless communication device is provided that is configured to prevent the ignition and combustion even when the wireless communication device is subjected to the high-frequency power for heating the food item while attached to the food item or the like.

DETAILED DESCRIPTION OF EMBODIMENTS

Figure 1A:
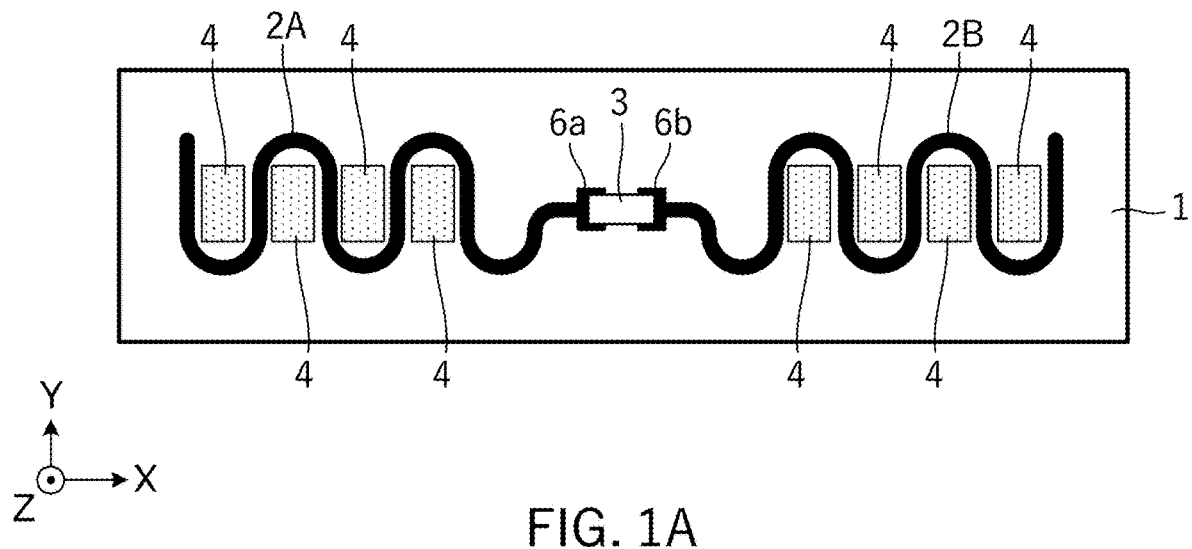
FIG. 1A is a plan view illustrating an RFID tag 101 according to a first embodiment.

First, configurations of various aspects in the wireless communication device according to the present invention will be described.

According to a first exemplary aspect of the present invention, a wireless communication device is provided that is configured to transmit and receive a communication signal and that includes a base material; an antenna pattern provided on the base material; a feeding circuit connected to the antenna pattern; and an application member provided on the base material or the antenna pattern, in which the application member contains moisture.

For example, when the wireless communication device of the first aspect having the above configuration is irradiated with the microwave in the chamber of the microwave oven, each part of the wireless communication device is microwave-heated, whereas the moisture contained in the application member has the high heating efficiency, so that the moisture is rapidly heated and vaporization of the moisture changes the atmosphere around the wireless communication device. For example, temperature rise is reduced in the vicinity of the application member by heat absorption action due to heat of vaporization of water. Additionally, the microwave power is absorbed by the moisture contained in the application member and the water vapor of the moisture, thereby reducing the microwave power to which the circuit including the antenna pattern is subjected. As a result, a risk of ignition can be prevented in the product to which the wireless communication device is attached.

In the wireless communication device according to a second exemplary aspect of the present invention, the application member is a member absorbing high-frequency power having a frequency higher than a frequency of the communication signal with higher efficiency than power of the communication signal.

In the wireless communication device according to a third exemplary aspect of the present invention, the high-frequency power having the frequency higher than the frequency of the communication signal is microwave power used for electromagnetic wave heating ranging from 2.4 GHz to 2.5 GHz inclusive.

In the wireless communication device according to a fourth exemplary aspect of the present invention, the application member is a member containing a water absorbing polymer that has absorbed water.

In the wireless communication device according to a fifth exemplary aspect of the present invention, the application member is a member containing a hydrogel.

In the wireless communication device according to a sixth exemplary aspect of the present invention, the application member covers the whole antenna pattern.

In the wireless communication device according to a seventh exemplary aspect of the present invention, the antenna pattern includes conductor patterns opposed to each other, and the application member is disposed between the conductor patterns opposed to each other.

In the wireless communication device according to an eighth exemplary aspect of the present invention, the application member comprises a plurality of application members disposed at positions sandwiching a part of the antenna pattern in a direction along a surface of the base material.

In the wireless communication device according to a ninth exemplary aspect of the present invention, the application member is disposed around a region where the antenna pattern is provided.

In the wireless communication device according to a tenth exemplary aspect of the present invention, the application member is provided on a surface of the base material opposite to a surface of the base material on which the antenna pattern is provided.

In the wireless communication device according to an eleventh exemplary aspect of the present invention, the base material is one of a plurality of insulation sheets defining a laminate, and the application member is a bonding material that bonds the plurality of insulation sheets.

In general, a convenience store and a supermarket that sell a product to which a wireless communication device is attached handle a wide variety of products such as food items and household goods. In recent years, as to the convenience store, various experiments have been conducted toward practical application of an "unmanned" convenience store that automates accounting and packing of the purchased product.

In order to automate the accounting of the product in the "unmanned" convenience store, it is considered that the RFID tag that is the wireless communication device is attached to all the products. In the "unmanned" convenience store, a system is provided in which information from the RFID tag is read to display a product price when a shopping basket, which accommodates the product with the RFID tag, is placed on a checkout table. A purchaser inserts cash for the product price into a cash slot or inserts a credit card to complete payment, and receives the product automatically packed in a shopping bag, whereby the purchase of the product can be completed in the "unmanned" convenience store.

Hereinafter, exemplary embodiments that are a specific illustration of a wireless communication device according to the present invention will be described with reference to the attached drawings. As the product to which the wireless communication device of the present invention is attached, all products handled in a store such as a so-called convenience store and supermarket are considered.

Although a microwave oven or the like that performs dielectric heating will be described as the electromagnetic wave heating device described in the following embodiments, a heating device having a function of performing dielectric heating is considered as the electromagnetic wave heating device of the exemplary embodiments of the present invention. Further, in the following embodiments, an RFID tag attached to the product will be described as an example of the wireless communication device.

Hereinafter, a plurality of exemplary embodiments of the present invention will sequentially be described. It is noted that the same component is designated by the same reference sign in each of the drawings referred to in each embodiment. The exemplary embodiments are separately described for the sake of convenience in consideration of the description of a main point or ease of understanding, but configurations of different embodiments may partially be substituted or combined. In the second and subsequent embodiments, the description of a matter common to that of the first embodiment is omitted, and only a different point will be described. In particular, the same operation and effect with the same configuration will not successively be described in each embodiment.

First Exemplary Embodiment

Figure 1B:
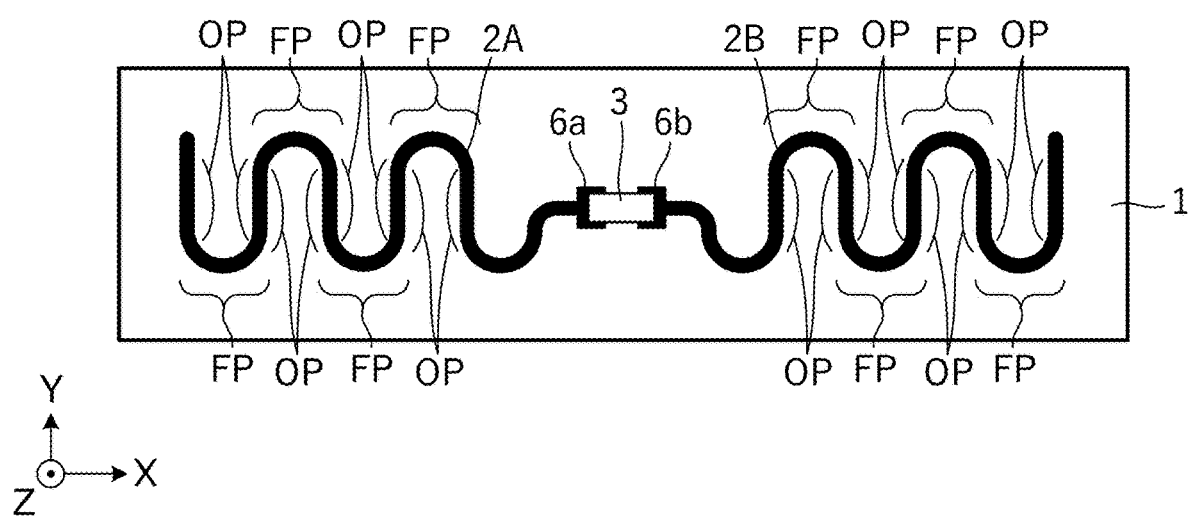
FIG. 1B is a plan view illustrating the RFID tag 101 in a state before an application member 4 is provided.

FIG. 1A is a plan view illustrating an RFID tag 101 according to a first embodiment, and FIG. 1B is a plan view illustrating the RFID tag 101 in a state before an application member 4 is provided. As shown, the RFID tag 101 includes an insulating base material 1, antenna patterns 2A, 2B provided on the base material 1, and an RFIC package 3 connected to the antenna patterns 2A, 2B. Moreover, the application member 4 is disposed on the base material 1.

Figure 2:
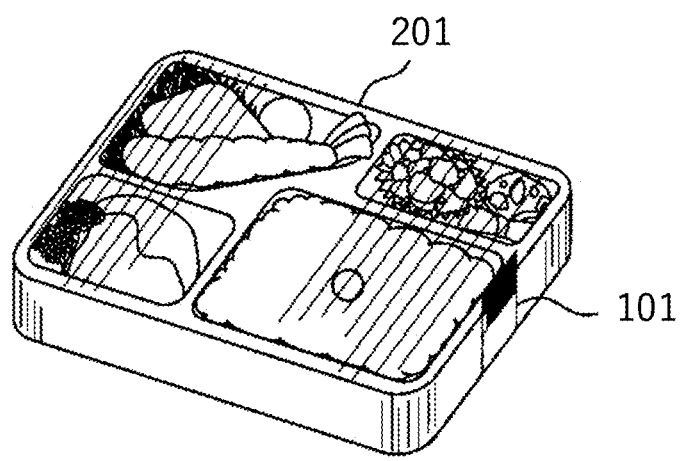
FIG. 2 illustrates an example of a product to which an RFID tag is attached, and is a perspective view illustrating a lunch box 201 to which the RFID tag 101 is attached.

FIG. 2 illustrates an example of a product to which the RFID tag is attached, and is a perspective view illustrating a lunch box 201 to which the RFID tag 101 is attached.

The RFID tag 101 of the present embodiment is configured to conduct wireless communication (i.e., transmission and reception) using a high-frequency signal having a frequency (i.e., a carrier frequency) of a communication signal in a UHF band. The UHF band is a frequency band of 860 MHz to 960 MHz. Here, the frequency of the communication signal in the UHF band is an example of a frequency of a communication signal in the present disclosure.

The RFID tag 101 includes the RFIC package 3 (described below and considered a feeding circuit), the antenna patterns 2A, 2B, and the base material 1 that is an insulator and a dielectric. In the RFID tag 101 of the present embodiment, a flexible film material or a flame-retardant film material is used as the base material 1. In the exemplary aspect, the base material 1 has an outline as a rectangular shape in planar view. When the base material 1 is a normal film material that is not flame-retardant, a thickness of the base material 1 may be less than or equal to 38 μm.

Consequently, the base material 1 melts and deforms before burning, so that the shape of the base material cannot be maintained.

When the flame-retardant film is used as the base material 1, for example, a film in which a halogen-based flame-retardant material is added to a resin material such as a PET (polyethylene terephthalate) resin and a PPS (polyphenylene sulfide) resin or a film in which such a resin material is coated with a flame-retardant coating material is used as a flame-retardant film material to be used. A resin material, such as heat-resistant PEN (polyethylene naphthalate) resin, which has high functions in terms of heat resistance, hydrolysis resistance and chemical resistance, can also be used as a material for the base material 1. It is noted that a flame-retardant material is not necessarily needed for the base material 1. Alternatively, for example, the base material 1 may be made of a paper material.

The antenna patterns 2A, 2B are made of a conductive material such as aluminum foil or copper foil and are provided on the surface of the base material 1. The RFIC package 3 is mounted on the antenna patterns 2A, 2B provided on the surface of the base material 1, and the RFIC package 3 and the antenna patterns 2A, 2B are electrically connected to each other. For purposes of this disclosure, "electrically connected" means that components are connected or coupled such that a high-frequency signal is transmitted therebetween and they are operable, and is not limited to DC or direct connection.

As illustrated in FIGS. 1A and 1B, the antenna patterns 2A, 2B are an electric field emission type antenna pattern and each configured to extend with the first antenna pattern 2A having a meander line shape that meanders from a first land pattern 6a on which the RFIC package 3 is mounted while including a plurality of folded portions FP, and with the second antenna pattern 2B having a meander line shape that meanders from a second land pattern 6b on which the RFIC package 3 is mounted while including the plurality of folded portions FP. That is, the first antenna pattern 2A having the meander line shape extends from the first land pattern 6a toward one end in a longitudinal direction of the base material 1 (e.g., in a −X-direction). The second antenna pattern 2B having the meander line shape extends from the second land pattern 6b toward the other end in the longitudinal direction of the base material 1 (in a +X-direction).

With the above configuration, the antenna patterns 2A, 2B are collectively configured as a dipole type electric field antenna.

The folded portions FP of the antenna patterns 2A, 2B are places where the extending direction of each of the antenna patterns 2A, 2B is reversed. The antenna patterns 2A, 2B include conductor patterns OP that are opposed to each other by being folded back at the folded portion FP.

In the antenna patterns 2A, 2B, the application member 4 is provided between the conductor patterns OP opposed to each other.

As described above, the antenna patterns 2A, 2B are a metal material, such as an aluminum electrode and a copper electrode, which has high conductivity. In addition to the metal material, a carbon-based material may be used as the antenna patterns 2A, 2B.

The antenna patterns 2A, 2B provided on the surface of the base material 1 have a shape that prevents concentration of the electric field, and in particular, the antenna patterns 2A, 2B do not include an acute-angle portion, but are entirely a gently curved surface (curves) in a bent portion and an edge of an outer peripheral portion. That is, because the antenna patterns 2A, 2B have a rounded shape at the folded portion FP, the antenna patterns 2A, 2B do not include a place locally having a small curvature radius. Consequently, a place having high electric field strength cannot be provided, and the discharge itself hardly occurs.

The application member 4 is a member containing moisture (i.e., a moisture containing component or an ignition protection member). The application member 4 is configured to absorb the microwave power used for electromagnetic wave heating, with the microwave power having a frequency higher than the frequency of the communication signal, with higher efficiency than power of the communication signal. Here, the microwave is an electromagnetic wave in a frequency band ranging from 300 MHz to 300 GHz inclusive. For example, the frequency of the communication signal is the UHF band (the frequency band ranging from 860 MHz to 960 MHz inclusive), and the frequency of the microwave used for the electromagnetic wave heating is, for example, the 2.45 GHz band (the frequency band ranging from 2.4 GHz to 2.5 GHz inclusive).

Because the application member 4 contains moisture, the application member 4 absorbs the microwave power used for the electromagnetic wave heating with higher efficiency than the power of the communication signal. That is, during the original communication as the RFID tag, the application member 4 does not cause an adverse effect, and a loss of the power of the high frequency signal is small. On the other hand, when the dielectric is subjected to the microwave power used for the electromagnetic wave heating, the dielectric generates heat by dielectric heating.

The dielectric heating occurs based on a dielectric loss of the dielectric, and in particular, water has the large dielectric loss and is efficiently heated by the microwave power as described below.

In general, it is known that a water molecule is composed of one oxygen atom and two hydrogen atoms and has no charge as a whole, and the water molecule form a permanent dipole because two hydrogen atoms are bonded to the oxygen atom at an angle of about 104.5° (because they are asymmetrical). The permanent dipoles of the water molecules have a large delay due to viscous resistance (dielectric aftereffect) and follow oscillation of the microwave electric field slightly later, namely, the permanent dipoles change with a phase delay with respect to the change in the microwave electric field, so that the delay acts as a resistance to the change in the microwave electric field to heat the permanent dipoles. The microwave has a frequency that causes the water molecules that are the permanent dipoles to effectively generate the above action. Thus, moisture absorbs the microwave power and generates heat.

For example, when the product to which the RFID tag 101 of the present embodiment is attached is irradiated with the microwave in the chamber of the microwave oven, the base material of the RFID tag 101 is dielectrically heated, whereas the moisture contained in the application member has the high heating efficiency as described above, so that the moisture is rapidly heated to change an atmosphere around the RFID tag 101 due to vaporization of the moisture. For example, temperature rise in a vicinity of the application member 4 is reduced by heat absorption action due to the heat of vaporization of water. Additionally, the microwave power is absorbed by the moisture contained in the application member 4 and the water vapor of the moisture, thereby reducing the microwave power to which the circuit including the antenna patterns 2A, 2B is subjected. As a result, a risk of ignition can be prevented in the product to which the RFID tag 101 is attached.

According to the exemplary aspect, a member containing a water absorbing polymer that absorbs water is an example of the application member 4. For example, polyacrylic acid has a large number of hydrophilic groups, and cross-links to a network structure by the water absorption to form a sodium salt, resulting in a highly water-absorbing gel. The application member 4 is provided by printing the highly water-absorbing gel on the base material 1. Alternatively, the application member 4 may be provided by bonding a sheet in which the highly water-absorbing gel is covered with a resin film.

A member containing a hydrogel is an example of the application member 4. The hydrogel is a gel (water-containing wet gel) in which a dispersion medium (corresponding to a solvent in a colloidal solution) is water. The application member 4 is provided by printing a substance containing this hydrogel on the base material 1. Alternatively, the application member 4 may be provided by bonding a sheet in which the substance containing the hydrogel is coated with a resin film.

When the RFID tag 101 is subjected to the high-power microwave for the electromagnetic wave heating, there is a risk that discharge occurs at a place of the antenna patterns 2A, 2B, where a potential difference is large. For example, in the antenna patterns 2A, 2B, the potential difference between the conductor patterns OP opposed to each other becomes large, and the discharge easily occurs between the conductor patterns OP opposed to each other. However, because the application member 4 is provided between the conductor patterns OP opposed to each other and on the surface on which the antenna patterns 2A, 2B are provided, the temperature rise in the vicinity of the application member 4 is reduced even when the discharge occurs, and progress from the discharge to the ignition is effectively prevented.

Preferably, an amount of moisture contained in the application member 4 is an amount of an extent in which water vapor pressure of an entire periphery of the RFID tag 101 becomes higher than the water vapor pressure of air when the RFID tag 101 receives the high-power microwave for the electromagnetic wave heating.

In the present embodiment, because the application member 4 is provided on the surface on which the antenna patterns 2A, 2B are provided and between the conductor patterns OP opposed to each other in the surface of the base material 1, namely, because the application member 4 does not cover the antenna patterns 2A, 2B (in the plan view), the RFID tag 101 including the application member 4 is configured without increasing an average thickness of the RFID tag 101. Because the application member 4 does not cover the antenna patterns 2A, 2B, the application member 4 has the small influence on an electrical characteristic of the antenna patterns 2A, 2B as the dipole type electric field antenna. In particular, because the electric field strength is lower in the vicinity of the connection end of the RFIC package 3 than the leading end (open end) of each of the antenna patterns 2A, 2B, preferably the application member 4 is provided while avoiding the leading ends (open ends) of the antenna patterns 2A, 2B.

Figure 3:
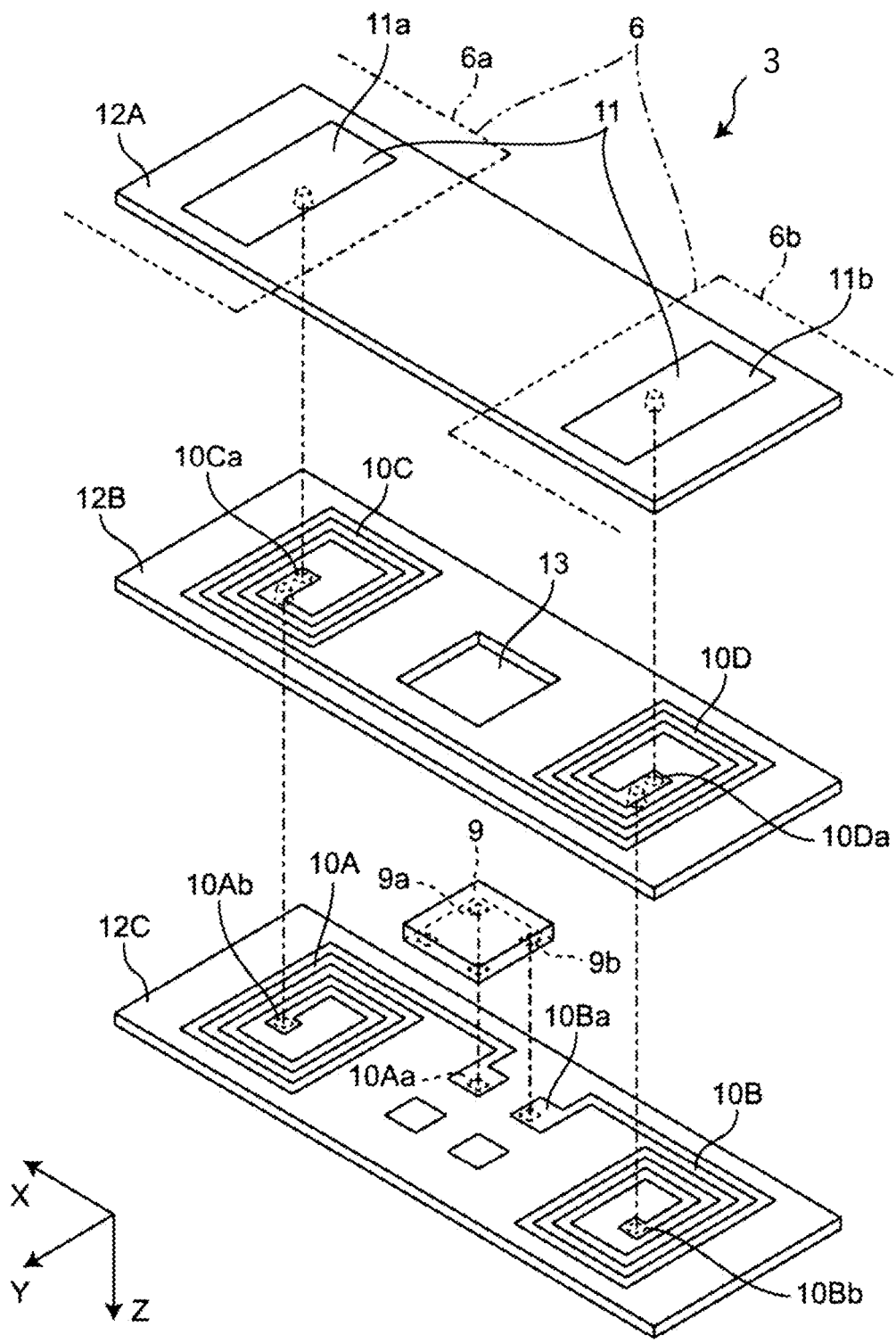
FIG. 3 is an exploded perspective view illustrating a configuration of an RFIC package 3 mounted on land patterns 6a, 6b of antenna patterns 2A, 2B.

FIG. 3 is an exploded perspective view illustrating the configuration of the RFIC package 3 mounted on the land patterns 6 (6a, 6b) of the antenna patterns 2A, 2B. As illustrated in FIG. 3, the RFIC package 3 of the first embodiment is constructed with a multilayer substrate including three layers. Specifically, the multilayer substrate of the RFIC package 3 is made of a resin material such as polyimide and a liquid crystal polymer, and is provided by laminating three flexible insulation sheets 12A, 12B, 12C. The insulation sheets 12A, 12B, 12C have a substantially quadrilateral shape in planar view, and have a substantially rectangular shape in the present embodiment. The RFIC package 3 in FIG. 3 shows a state in which the RFIC package 3 in FIGS. 1A and 1B is turned over and the three layers are disassembled.

As illustrated in FIG. 3, in the RFIC package 3, an RFIC chip 9, a plurality of inductance elements 10A, 10B, 10C, 10D, and external connection terminals 11 (11a, 11b) connected to the antenna patterns 2A, 2B are provided at desired positions on three layered substrates (insulation sheets 12A, 12B, 12C).

The external connection terminals 11a, 11b are provided on the first insulation sheet 12A that forms a lowermost layer (the substrate opposed to the antenna patterns 2A, 2B), and at positions opposed to the land patterns 6a, 6b of the antenna patterns 2A, 2B. The four inductance elements 10A, 10B, 10C, 10D are separated into groups of two and provided on the second insulation sheet 12B and the third insulation sheet 12C. That is, the first inductance element 10A and the second inductance element 10B are provided on the third insulation sheet 12C that forms an uppermost layer (the layer described at the lowest position in FIG. 3), and the third inductance element 10C and the fourth inductance element 10D are provided on the second insulation sheet 12B that forms an intermediate layer.

In the RFIC package 3 of the present embodiment, the external connection terminals 11a, 11b and the four inductance elements 10A, 10B, 10C, 10D are constructed with a conductor pattern made of a conductive material such as an aluminum foil and a copper foil.

As illustrated in FIG. 3, the RFIC chip 9 is mounted on the third insulation sheet 12C, which forms the uppermost layer, in a central portion in the longitudinal direction (an X-direction in FIG. 3). The RFIC chip 9 has a structure in which an RF circuit is provided on a semiconductor substrate made of a semiconductor such as silicon. The first inductance element 10A formed into a spiral shape on one side (the side in the +X-direction in FIG. 3) in the longitudinal direction on the third insulation sheet 12C is connected to one input-output terminal 9a of the RFIC chip 9 through a land 10Aa. The second inductance element 10B formed into the spiral shape on the other side (the side in the −X-direction in FIG. 3) in the longitudinal direction on the third insulation sheet 12C is connected to the other input-output terminal 9b of the RFIC chip 9 through a land 10Ba.

The spiral-shaped third inductance element 10C is provided on one side (the side in the +X-direction in FIG. 3) in the longitudinal direction on the second insulation sheet 12B that forms the intermediate layer, and the spiral-shaped fourth inductance element 10D is provided on the other side (the side in the −X-direction in FIG. 3) in the longitudinal direction on the second insulation sheet 12B. The end on the outer peripheral side of the spiral-shaped third inductance element 10C and the end on the outer peripheral side of the spiral-shaped fourth inductance element 10D are directly connected to each other. On the other hand, a land 10Ca that is the end on an inner peripheral side of the third inductance element 10C is connected to a land 10Ab that is the end on the inner peripheral side of the spiral-shaped first inductance element 10A on the third insulation sheet 12C through an interlayer connection conductor, such as a via conductor, which penetrates the second insulation sheet 12B. The land 10Ca that is the end on the inner peripheral side of the third inductance element 10C is connected to the first external connection terminal 11a on the first insulation sheet 12A through an interlayer connection conductor, such as a through-hole conductor, which penetrates the first insulation sheet 12A that forms the lowermost layer.

A land 10Da that is the end on the inner peripheral side of the fourth inductance element 10D is connected to a land 10Bb that is the end on the inner peripheral side of the spiral-shaped second inductance element 10B on the third insulation sheet 12C through an interlayer connection conductor, such as a through-hole conductor, which penetrates the second insulation sheet 12B. The land 10Da that is the end on the inner peripheral side of the fourth inductance element 10D is connected to the second external connection terminal 11b on the first insulation sheet 12A through an interlayer connection conductor, such as a through-hole conductor, which penetrates the first insulation sheet 12A that forms the lowermost layer.

The first external connection terminal 11a on the first insulation sheet 12A is disposed so as to be connected to a first land pattern 6a of the first antenna pattern 2A provided on the base material 1. The second external connection terminal 11b on the first insulation sheet 12A is disposed to be connected to a second land pattern 6b of the second antenna pattern 2B provided on the base material 1.

A through-hole 13, in which the RFIC chip 9 mounted on the third insulation sheet 12C is accommodated, is provided in the second insulation sheet 12B that forms the intermediate layer. The RFIC chip 9 is disposed between the first inductance element 10A and the second inductance element 10B and between the third inductance element 10C and the fourth inductance element 10D. For this reason, the RFIC chip 9 functions as a shield, magnetic field coupling and electric field coupling between the first inductance element 10A and the second inductance element 10B are prevented, and similarly magnetic field coupling and electric field coupling between the third inductance element 10C and the fourth inductance element 10D are prevented. As a result, in the RFIC package 3, a passband of the communication signal is prevented from being narrowed, and the passband is widened.

In the present embodiment, the RFIC package 3 is mounted on the antenna patterns 2A, 2B. Alternatively, the RFIC chip 9 may directly be mounted on the antenna patterns 2A, 2B. In this case, the inductors configured as the plurality of inductance elements 10A, 10B, 10C, 10D in the RFIC package 3 may be configured on the base material 1 while having a loop-shaped pattern.

Second Exemplary Embodiment

In a second exemplary embodiment, several RFID tags different from the example of the first embodiment in the position where the application member 4 is provided with respect to the base material 1 and in the shape of the application member 4 will be described with reference to FIGS. 4 to 8.

Figure 4:
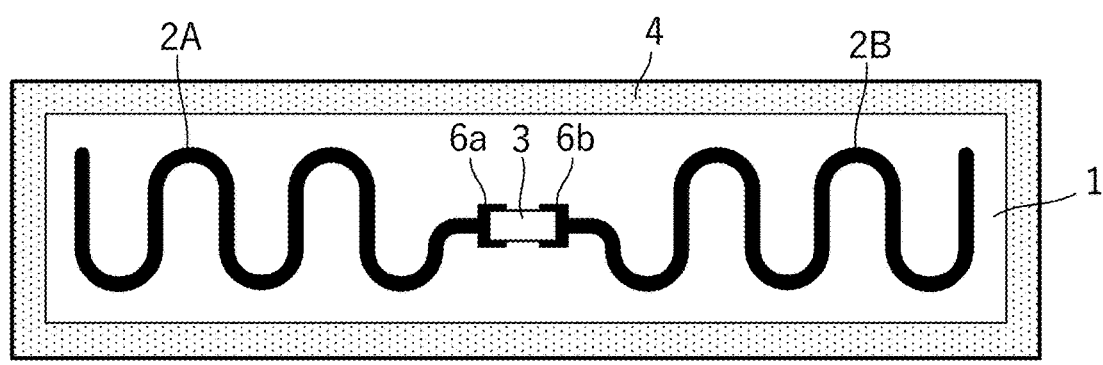
FIG. 4 is a plan view illustrating an RFID tag 102A according to a second embodiment.
Figure 4:
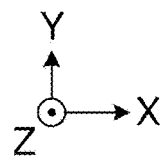

FIG. 4 is a plan view illustrating an RFID tag 102A of the second embodiment. The RFID tag 102A includes the insulating base material 1, the antenna patterns 2A, 2B provided on the base material 1, and the RFIC package 3 connected to the antenna patterns 2A, 2B. The application member 4 is provided on the base material 1. In this example, the application member 4 is provided along the periphery of the base material 1. As shown, the application member 4 does not overlap the antenna patterns 2A, 2B in planar view.

The RFID tag 102A configured as described above also obtains the same effect as the RFID tag 101 of the first embodiment. In particular, because the application member 4 is not disposed between the mutually-opposed conductor patterns of the antenna patterns 2A, 2B, the application member 4 has the small influence on the electrical characteristic of the antenna patterns 2A, 2B as the dipole type electric field antenna. An entire area and a volume of the application member 4 can be increased because the application member 4 is provided along the periphery of the base material 1, so that the effect of the change in the atmosphere around the RFID tag 101 is high.

Figure 5:
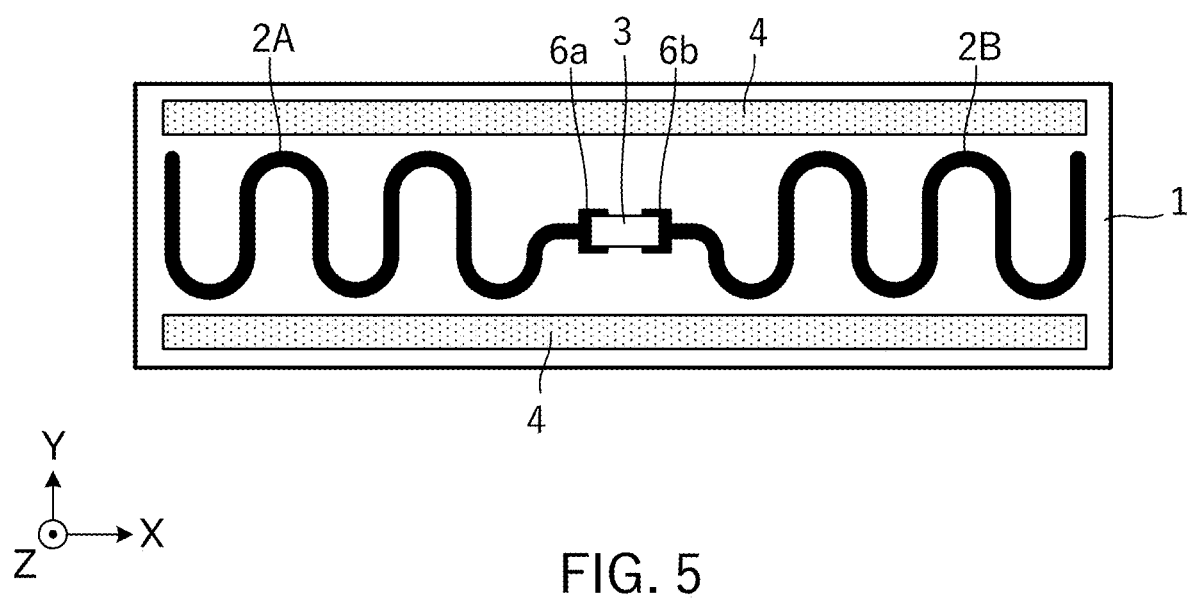
FIG. 5 is a plan view illustrating another RFID tag 102B of the second embodiment.

FIG. 5 is a plan view illustrating another RFID tag 102B of the second embodiment. In the RFID tag 102B, two application members 4 extending in the direction (i.e. parallel to the X-direction) in which the antenna patterns 2A, 2B entirely extend are provided on the base material 1. The two application members 4 are disposed along the antenna patterns 2A, 2B without overlapping the antenna patterns 2A, 2B. Other configurations are as illustrated in the first embodiment.

According to the RFID tag 102B configured as described above, because the application member 4 does not exist at the ends in the longitudinal direction of the entirety of antenna patterns 2A, 2B, a dimension in the longitudinal direction of the base material 1 can be shortened as compared with the structure in FIG. 4.

Figure 6:
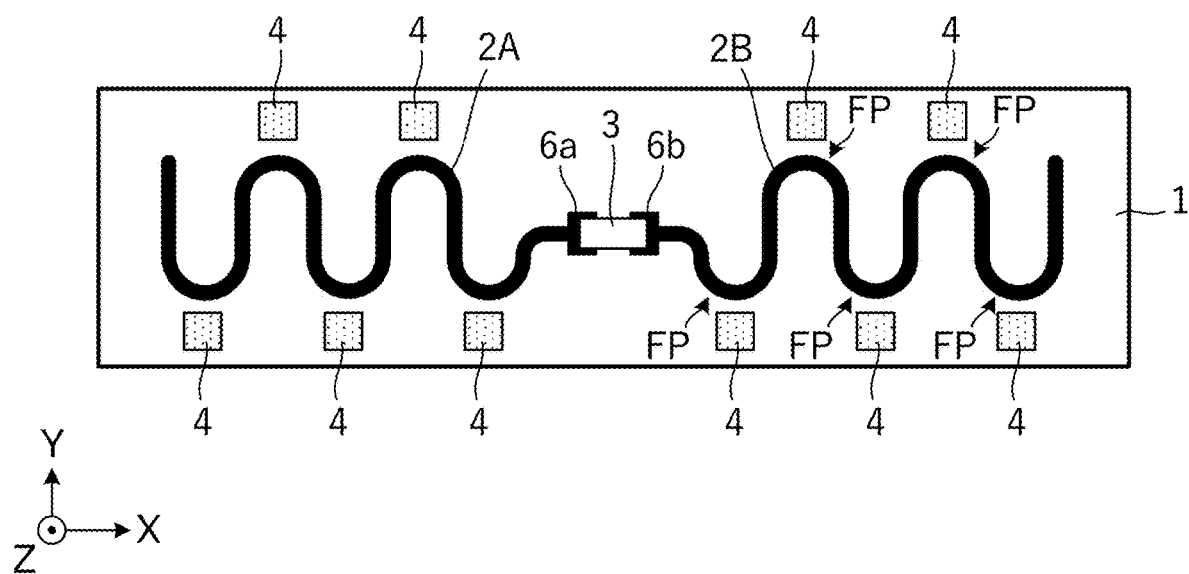
FIG. 6 is a plan view illustrating another RFID tag 102C of the second embodiment.

FIG. 6 is a plan view illustrating another RFID tag 102C of the second embodiment. In the RFID tag 102C, the plurality of application members 4 are arranged in the direction (X-direction) in which the antenna patterns 2A, 2B entirely extend. The application member 4 is disposed at proximity positions of the folded portions FP of the antenna patterns 2A, 2B. Other configurations are as illustrated in the first embodiment.

Figure 7:
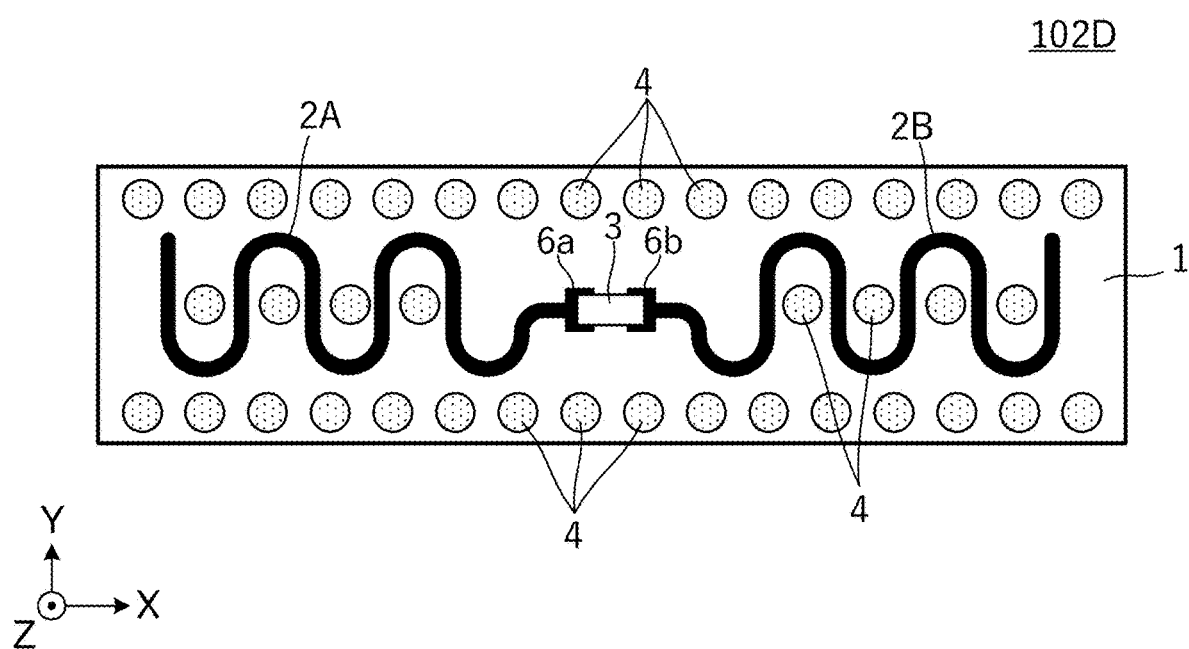
FIG. 7 is a plan view illustrating another RFID tag 102D of the second embodiment.

FIG. 7 is a plan view illustrating another RFID tag 102D of the second embodiment. In the RFID tag 102D, a plurality of application members 4 are arranged in the direction (e.g., in the X-direction) in which the antenna patterns 2A, 2B entirely extend. The application member 4 is also disposed between the mutually-opposed conductor patterns of the antenna patterns 2A, 2B. Other configurations are as illustrated in the first embodiment.

Figure 8:
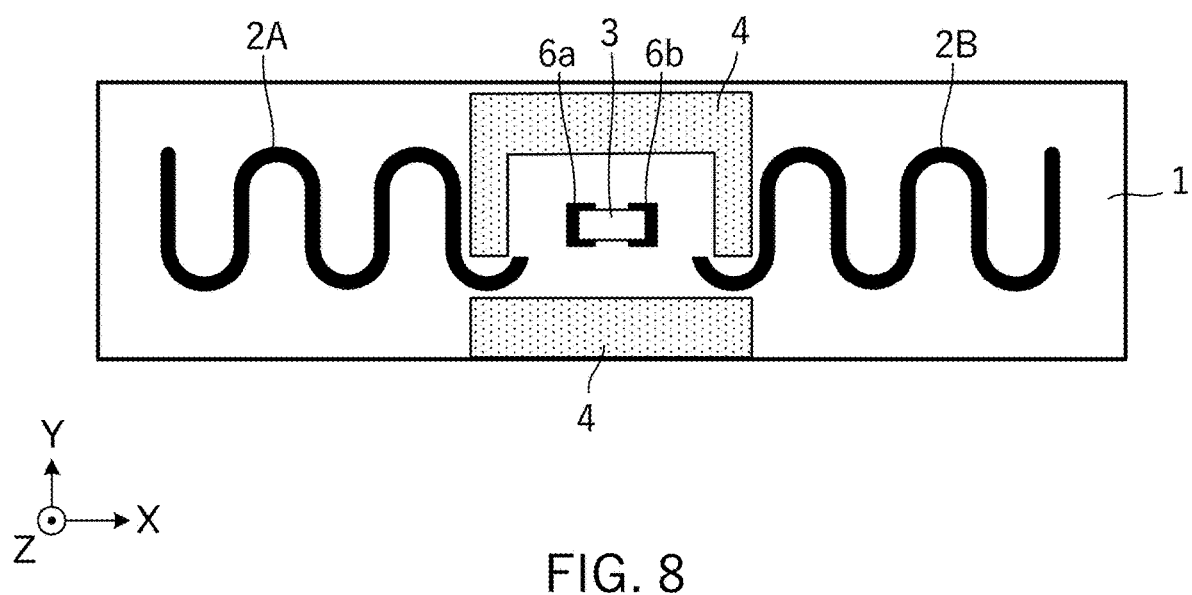
FIG. 8 is a plan view illustrating another RFID tag 102E of the second embodiment.

FIG. 8 is a plan view illustrating another RFID tag 102E of the second embodiment. In the RFID tag 102E, the application members 4 are provided on the base material 1 so as to surround the periphery of the RFIC package 3. When the discharge easily occurs in the vicinity of the RFIC package 3 or between the antenna pattern 2A and the antenna pattern 2B, the progress from the discharge to the ignition is effectively prevented by the application members 4 surrounding the periphery of the RFIC package 3.

Third Exemplary Embodiment

In a third embodiment, an RFID tag in which the application member 4 is disposed at a position overlapping the antenna pattern (i.e., in the thickness or z-direction) will be described with reference to FIGS. 9 to 13.

Figure 9:
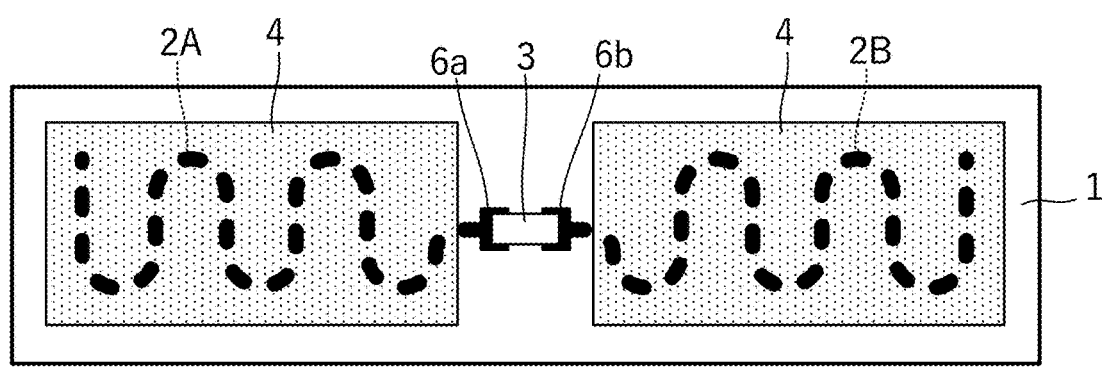
FIG. 9 is a plan view illustrating an RFID tag 103A according to a third embodiment.
Figure 9:
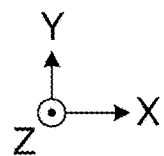

FIG. 9 is a plan view illustrating an RFID tag 103A of the third embodiment. The RFID tag 103A includes the insulating base material 1, the antenna patterns 2A, 2B provided on the base material 1, and the RFIC package 3 connected to the antenna patterns 2A, 2B. The application member 4 is provided on the base material 1. In this example, the application members 4 overlap the antenna patterns 2A, 2B.

Figure 10:
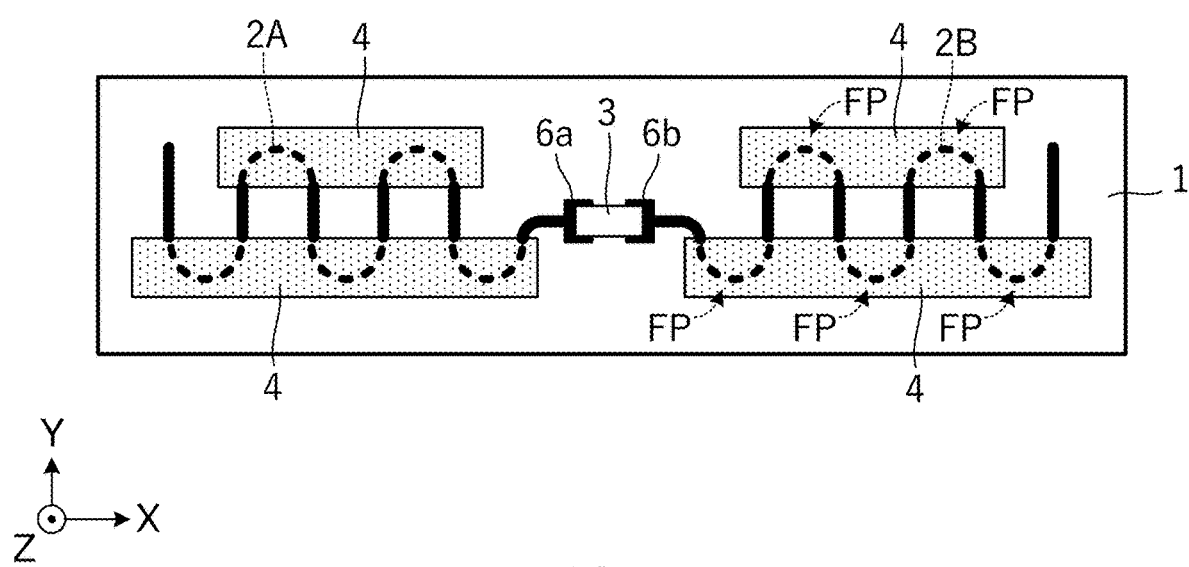
FIG. 10 is a plan view illustrating another RFID tag 103B of the third embodiment.

FIG. 10 is a plan view illustrating another RFID tag 103B of the third embodiment. In the RFID tag 103B, the application members 4 overlap the folded portions FP of the antenna patterns 2A, 2B and the peripheries of the folded portions FP.

Figure 11:
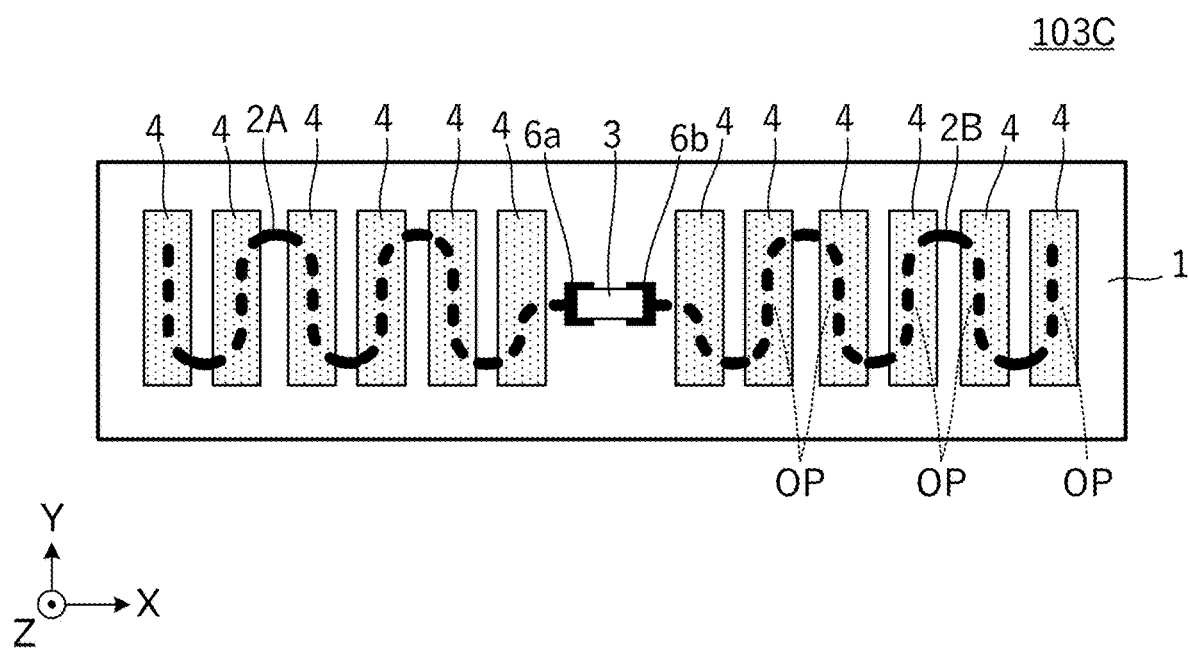
FIG. 11 is a plan view illustrating another RFID tag 103C of the third embodiment.

FIG. 11 is a plan view illustrating another RFID tag 103C of the third embodiment. In the RFID tag 103C, the application members 4 overlap the conductor patterns OP of the opposed portions of the antenna patterns 2A, 2B and the peripheries of the conductor patterns OP.

Figure 12:
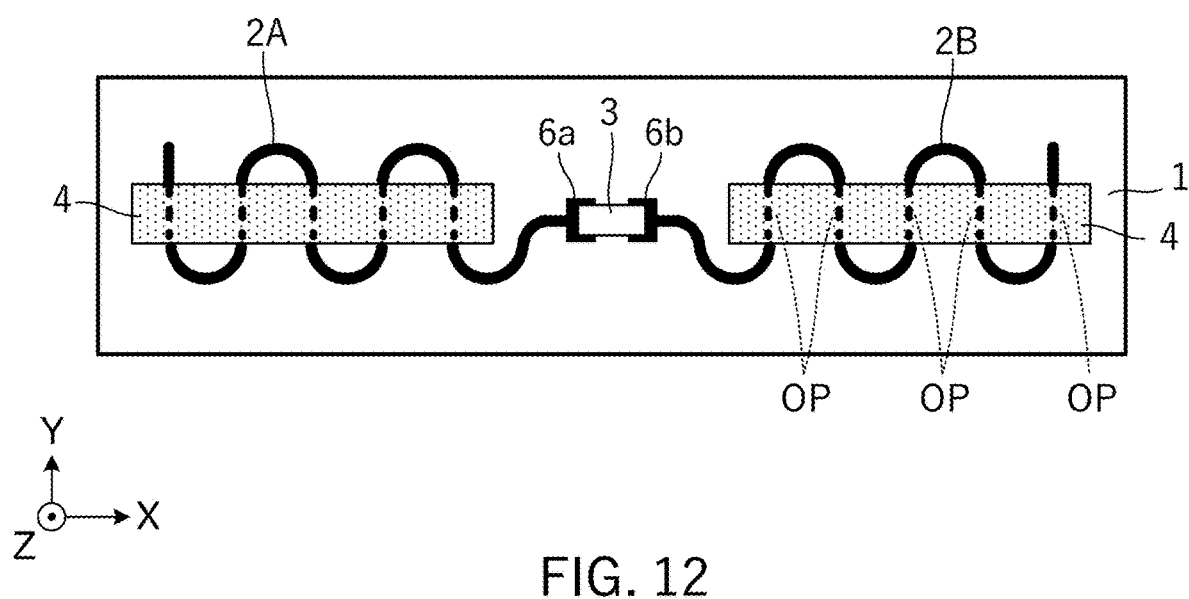
FIG. 12 is a plan view illustrating another RFID tag 103D of the third embodiment.

FIG. 12 is a plan view illustrating another RFID tag 103D of the third embodiment. In the RFID tag 103D, the application member 4 overlaps a part of the conductor patterns OP of the opposed portions of the antenna patterns 2A, 2B and a part between the opposed portions.

Figure 13:
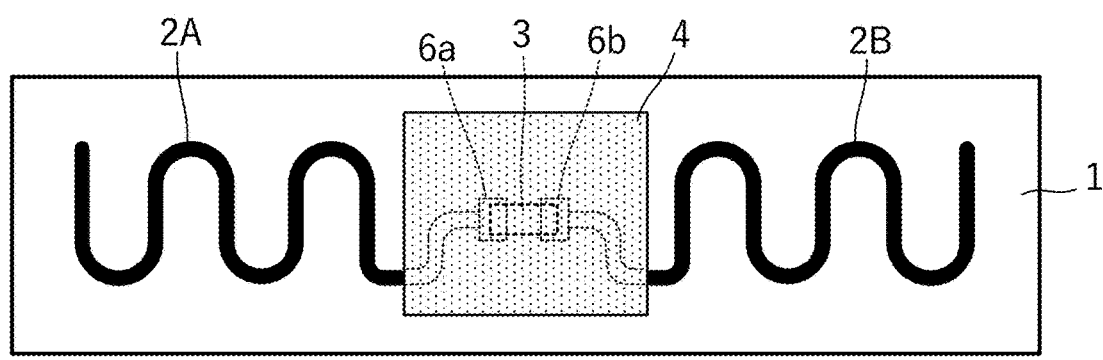
FIG. 13 is a plan view illustrating another RFID tag 103E of the third embodiment.
Figure 13:
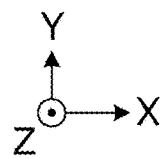

FIG. 13 is a plan view illustrating another RFID tag 103E of the third embodiment. In the RFID tag 103E, the application member 4 overlaps the RFIC package 3 and the periphery of the RFIC package 3.

As illustrated in FIG. 9 to FIG. 12, the application member 4 can overlap a part or whole of the antenna patterns 2A, 2B. According to the present embodiment, the application member 4 is closer to the antenna patterns 2A, 2B, and the area and volume of the application member 4 can be easily increased, so that the ignition from the antenna patterns 2A, 2B or the vicinity of the antenna patterns 2A, 2B can be effectively prevented when the discharge occurs or the heat is generated in the antenna patterns 2A, 2B.

As illustrated in FIG. 13, when the application member 4 has a structure in which the application member 4 covers the RFIC package 3 and the vicinity of the RFIC package 3, the progress from the discharge to the ignition is effectively prevented by the application member 4 surrounding the periphery of the RFIC package 3 when the discharge easily occurs in the vicinity of the RFIC package 3 or between the antenna pattern 2A and the antenna pattern 2B.

Fourth Exemplary Embodiment

In a fourth embodiment, an RFID tag in which the application member 4 is provided on a substantially entire surface of the base material 1 will be described.

Figure 14A:
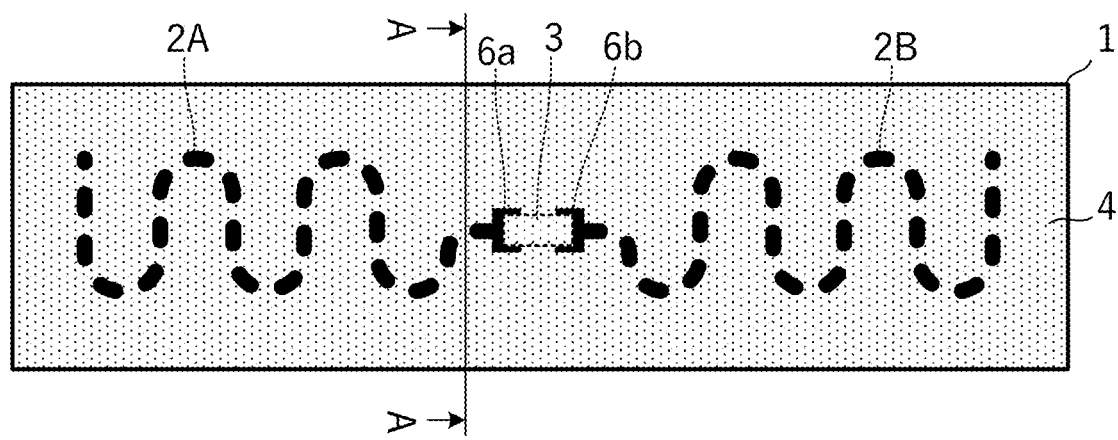
FIG. 14A is a plan view of an RFID tag 104A according to a fourth embodiment.
Figure 14B:
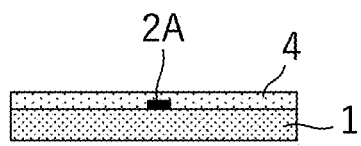
FIG. 14B is a sectional view taken along line A-A in FIG. 14A.

FIG. 14A is a plan view of an RFID tag 104A, and FIG. 14(B) is a sectional view taken along line A-A in FIG. 14A. The RFID tag 104A includes the insulating base material 1, the antenna patterns 2A, 2B provided on the base material 1, and the RFIC package 3 connected to the antenna patterns 2A, 2B. The application member 4 is provided on an entire top surface of the base material 1.

Figure 15A:
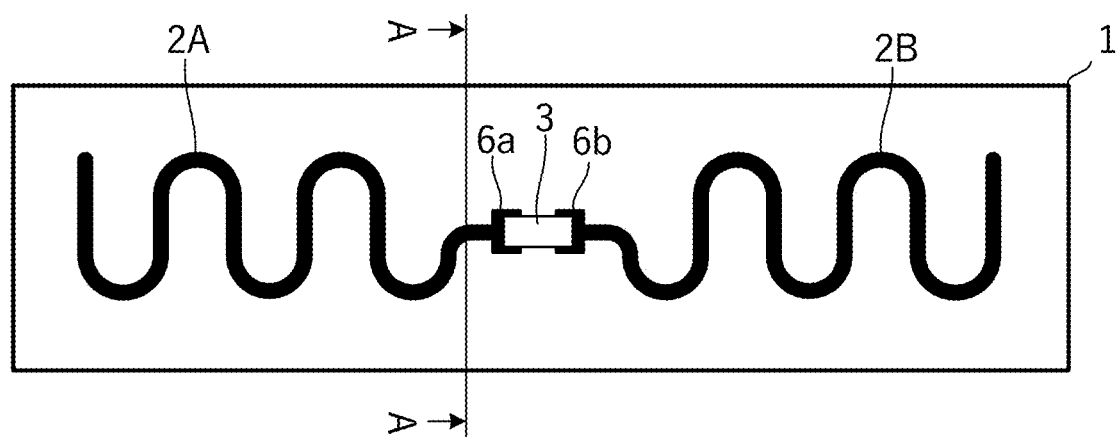
FIG. 15A is a plan view of another RFID tag 104B of the fourth embodiment.
Figure 15B:
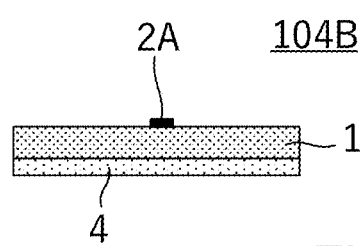
FIG. 15B is a sectional view taken along line A-A in FIG. 15A.

FIG. 15A is a plan view of an RFID tag 104B, and FIG. 15(B) is a sectional view taken along line A-A in FIG. 15A. The RFID tag 104B includes the insulating base material 1, the antenna patterns 2A, 2B provided on the base material 1, and the RFIC package 3 connected to the antenna patterns 2A, 2B. The application member 4 is provided in an entire bottom surface of the base material 1.

As described above, the application member 4 can be provided on the entire surface of the base material 1. Consequently, the area and volume of the application member 4 can be easily increased, so that the atmosphere around the wireless communication device can easily be changed. The microwave power is absorbed by the relatively large amount of moisture contained in the application member and the water vapor of the moisture, thereby effectively reducing the microwave power to which the circuit including the antenna pattern is subjected.

Fifth Exemplary Embodiment

In a fifth embodiment, an RFID tag in which the application member is provided in the base material will be described.

Figure 16A:
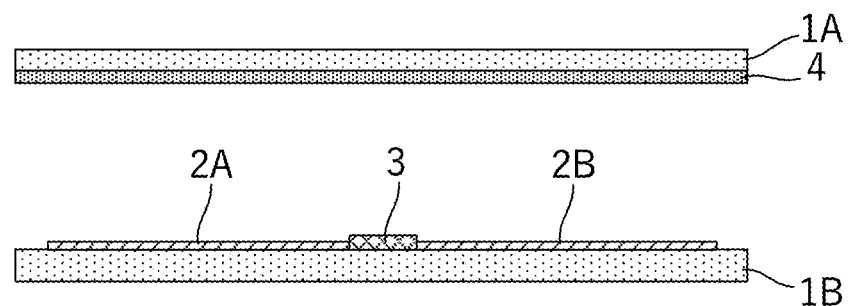
FIG. 16A is a sectional view illustrating a middle of a process of manufacturing an RFID tag 105 according to a fifth embodiment.
Figure 16B:
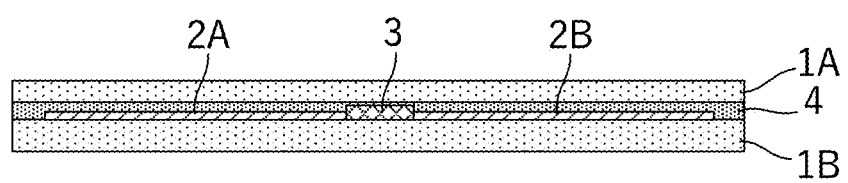
FIG. 16B is a sectional view of the RFID tag 105.

FIG. 16A is a sectional view illustrating a middle process of manufacturing an RFID tag 105 of the fifth embodiment. FIG. 16B is a sectional view of the RFID tag 105.

The RFID tag 105 of the present embodiment includes an insulating base material 1B, the antenna patterns 2A, 2B provided on the base material 1B, and the RFIC package 3 connected to the antenna patterns 2A, 2B. The RFID tag 105 also includes a base material 1A overlapping the base material 1B. The application member 4 is provided on a surface of the base material 1A that is opposed to the base material 1B. The application member 4 has adhesiveness, and the base material 1A is bonded to the base material 1B with the application member 4. That is, the application member 4 is provided between the base materials 1A, 1B, and the application member 4 is provided inside a laminate of the base materials 1A, 1B.

For example, the application member 4 of the RFID tag 105 of the present embodiment is a bonding agent containing adhesive hydrogel or moisture.

It is noted that various patterns can be applied to a planar pattern of the application member 4. For example, any one of the patterns of the application members 4 included in the RFID tags of the above embodiments can be applied.

For example, the frequency of the communication signal may be in the UHF band (the frequency band ranging from 860 MHz to 960 MHz inclusive), and the frequency of the microwave used for the electromagnetic wave heating may be in the frequency band ranging from 902 MHz to 928 MHz inclusive, that is one of the industrial, scientific, and medical (ISM) application frequency bands.

As described above, even when the frequency of the microwave for the electromagnetic wave heating coincides with or is close to the frequency of the communication signal, the application member 4 of each embodiment acts effectively. That is, the moisture of the application member 4 hardly affects the communication adversely, and the temperature rise in the vicinity of the application member is reduced by the heat absorption action due to the heat of vaporization of water during the electromagnetic wave heating. The microwave power, to which the circuit including the antenna pattern is subjected, is reduced by the absorption of the microwave power by the moisture or its water vapor.

Sixth Exemplary Embodiment

An example of an HF-band RFID tag is illustrated in a sixth embodiment. Here, the HF band is a frequency band ranging from 13 MHz to 15 MHz inclusive.

Figure 17:
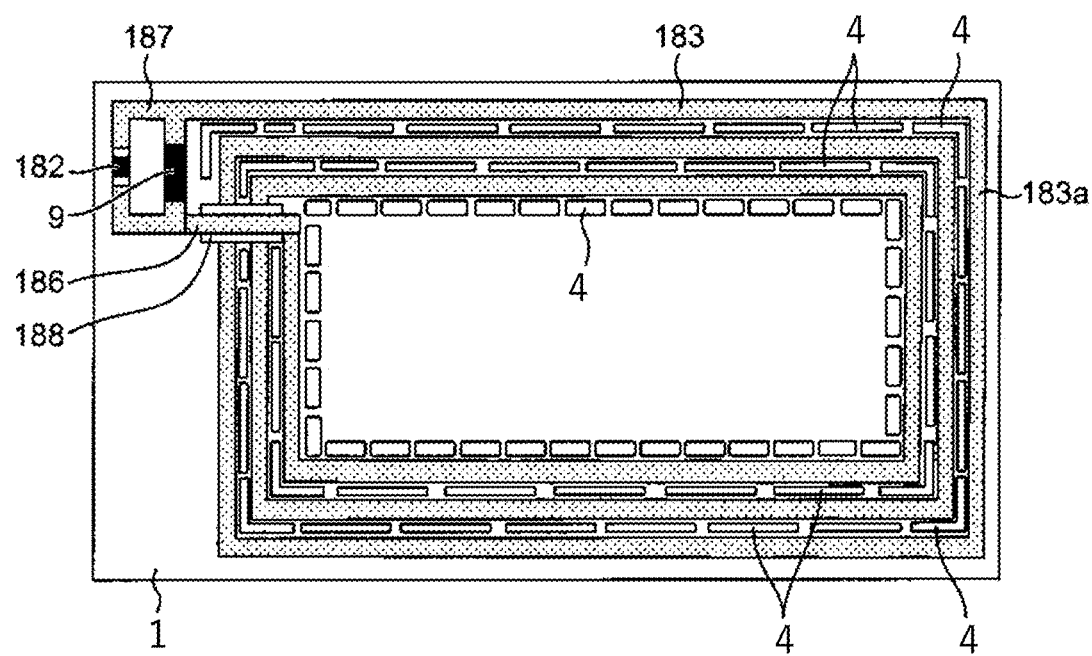
FIG. 17 is a plan view illustrating an RFID tag 106A according to a sixth embodiment.
Figure 18:
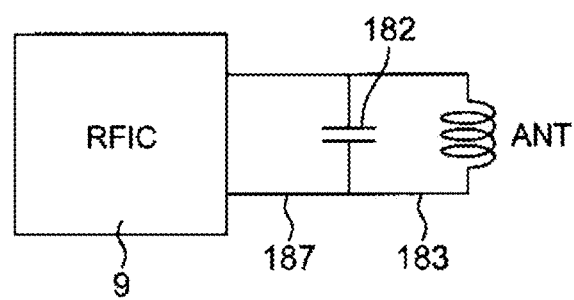
FIG. 18 is a circuit diagram of an RFID tag 106A.

FIG. 17 is a plan view illustrating an RFID tag 106A of the sixth embodiment. The RFID tag 106A is configured to conduct wireless communication using a high-frequency signal having a frequency (carrier frequency) of an HF-band communication signal, and configured to be able to conduct wireless communication in a wide frequency band. FIG. 18 is a circuit diagram of the RFID tag 106A.

As illustrated in FIG. 17, the RFID tag 106A includes an antenna pattern 183 including a loop portion 187 provided with the RFIC chip 9 and a chip capacitor 182. In the matching circuit defined by the loop portion 187 and the chip capacitor 182, the chip capacitor 182 is connected to a position opposed to the RFIC chip 9. An antenna element 183a of the antenna pattern 183 in the RFID tag 106A extends from the loop portion 187, and formed into a spiral shape. The antenna element 183a in FIG. 17 is drawn out inward from the loop portion 187 in a clockwise direction. The leading end that forms a drawn end of the antenna element 183a is directly connected to the matching circuit defined by the loop portion 187 and the chip capacitor 182 through a bridge pattern 186. An insulation pattern 188 made of a heat-resistant, electrical insulation material is disposed between the bridge pattern 186 and the antenna pattern 183, and an insulation state is ensured between the bridge pattern 186 and the antenna pattern 183.

On the base material 1, a plurality of application members 4 are disposed along the inside of the antenna element 183a. A plurality of application members 4 are also disposed between adjacent lines of the antenna pattern 183.

As described above, in the RFID tag 106A, the plurality of application members 4 are disposed along a route of the antenna pattern 183. The configuration of the application member 4 is the same as that of the first embodiment.

For example, when the product to which the RFID tag 106A of the present embodiment is attached is irradiated with the microwave in the chamber of the microwave oven, the base material 1 of the RFID tag 106A is dielectrically heated, whereas the moisture contained in the application member 4 has the high heating efficiency as described above, so that the moisture is rapidly heated and the vaporization of the moisture changes the atmosphere around the RFID tag 106A. For example, temperature rise in a vicinity of the application member 4 is reduced by heat absorption action due to the heat of vaporization of water. Additionally, the microwave power is absorbed by the moisture contained in the application member 4 and the water vapor of the moisture, thereby reducing the microwave power to which the circuit including the antenna pattern 183 is subjected. As a result, a risk of ignition can be prevented in the product to which the RFID tag 106A is attached.

Figure 19:
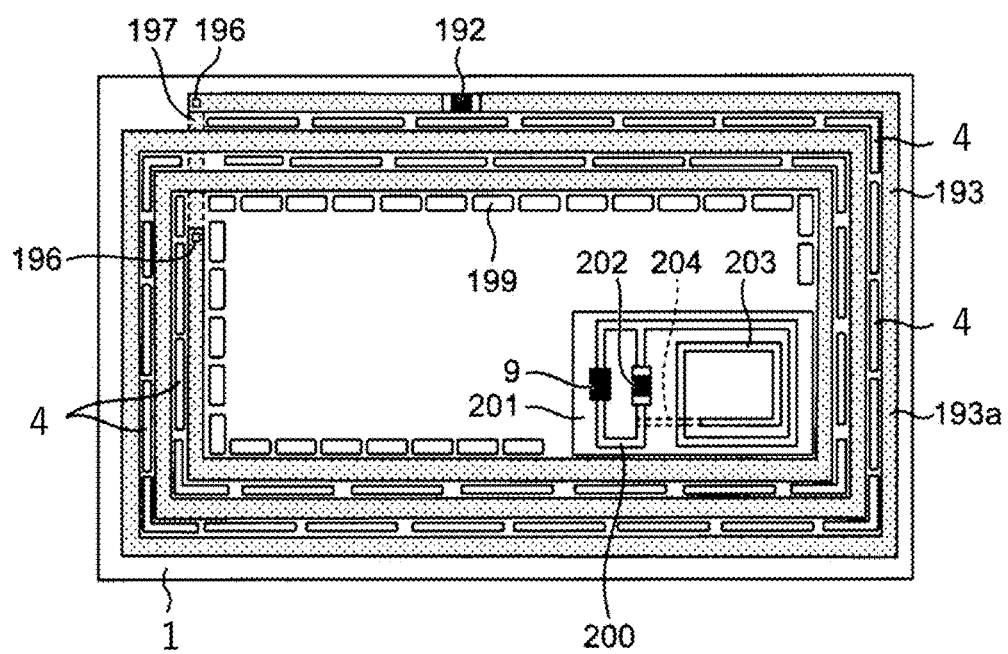
FIG. 19 is a plan view illustrating another RFID tag 106B of the sixth embodiment.
Figure 20:
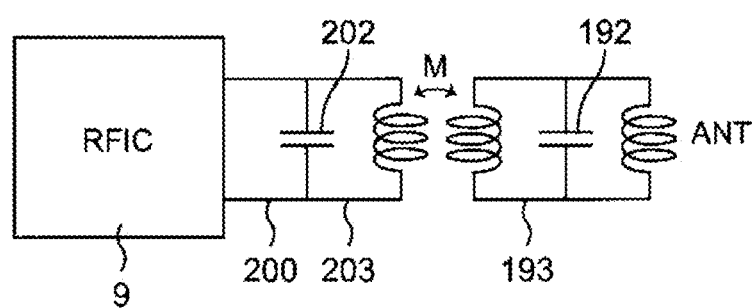
FIG. 20 is a circuit diagram of the RFID tag 106B.

FIG. 19 is a plan view illustrating another RFID tag 106B of the sixth embodiment. The RFID tag 106B is also configured to conduct wireless communication using the high-frequency signal having the frequency (carrier frequency) of the HF-band communication signal. FIG. 20 is a circuit diagram of the RFID tag 106B.

As illustrated in FIG. 19, the RFID tag 106B includes a resonant booster circuit including two coil patterns (193, 203). The coil pattern (i.e., a primary side coil pattern) 203 in the RFID tag 106B has a loop portion 200 provided with the RFIC chip 9 and a chip capacitor 202. In the matching circuit defined by the loop portion 200 and the chip capacitor 202, the RFIC chip 9 is connected to a position opposed to the chip capacitor 202. The coil pattern (i.e., the primary side coil pattern) 203 is drawn out into a spiral shape from the loop portion 200, and the leading end that is the drawn end is directly connected to the matching circuit defined by the loop portion 200 and the chip capacitor 202 through a bridge pattern 204. The coil pattern (primary side coil pattern) 203 is drawn out to be wound inward from the loop portion 200 in the clockwise direction.

The bridge pattern 204 is provided on a rear surface side of the base material 1, and the leading end that is the drawn end of the coil pattern (primary side coil pattern) 203 may be connected to the loop portion 200 through an interlayer connection conductor penetrating the base material 1. Alternatively, when the bridge pattern 204 is provided on the front surface side of the base material 1, an insulation pattern made of an electric insulation material having heat resistance may be disposed between the bridge pattern 204 and the primary side coil pattern 203 to secure the insulation state between the bridge pattern 204 and the primary side coil pattern 203.

The antenna pattern 193 that is the other coil pattern (i.e., a secondary side coil pattern) in the RFID tag 106B is provided so as to surround the coil pattern (i.e., the primary side coil pattern) 203, and includes the antenna element 193a wound inward in the clockwise direction. In the spiral-shaped antenna element 193a of the antenna pattern 193, the application members 4 are provided at predetermined intervals along the route of the antenna element 193a between the adjacent routes.

The antenna pattern 193 and the application member 4 in the RFID tag 106B are disposed on the front surface of the base material 1. The antenna element 193a of the antenna pattern 193 is provided with a capacitor element 192. An outside end and an inside end of the spiral-shaped antenna element 193a are electrically connected directly to each other by a conductive route pattern 197 provided on the rear surface of the base material 1 through an interlayer connection conductor 196 penetrating the base material 1.

A loop-shaped shield pattern 199 is provided inside the antenna element 193a. Similarly to the antenna pattern 193, the shield pattern 199 is made of a conductive material such as an aluminum foil and a copper foil according to the exemplary aspect. The shield pattern 199 is a completely closed loop, but may be a partially interrupted shield pattern.

As shown, the antenna pattern 193 and the primary side coil pattern 203 are coupled together as indicated by "M" in FIG. 20.

As described above, also in the RFID tag in which the resonant booster circuit is configured, the provision of the application member 4 is configured to prevent the risk of ignition in the product to which the RFID tag 106B is attached.

Also in the RFID tag in which the HF band is used as described in the present embodiments, the application member 4 can be a pattern that partially or entirely covers the antenna pattern as illustrated in the first to fifth embodiments. Moreover, the application member 4 can be a pattern that covers the periphery of the RFIC chip 9 or the RFIC chip 9. In the base material 1, the application member 4 can be provided on the surface opposite to the surface on which the antenna pattern is provided.

As described in each embodiment using the specific configuration, with these embodiment, the ignition of the RFID tag and the ignition of the product to which the RFID tag is attached can be prevented when the product to which the RFID tag is attached is heated by the electromagnetic wave heating device. Thus, the present invention provides the wireless communication device that can construct a system that automates accounting and packing of the purchased product in a shop, such as a convenience store, which handles a wide variety of products such as food item and household goods, and that can make great advance to the practical application of an "unmanned" convenience store.

Lastly, the description of the above embodiments is illustrative in all respects, but not restrictive. Modifications and changes can appropriately be made by those skilled in the art. The scope of the present invention is not limited to the above embodiments, but is defined by the scope of the claims. Additionally, the scope of the present invention includes modifications of the embodiments within the scope equivalent to the scope of the claims.

The invention claimed is:

1. A wireless communication device for transmitting and receiving a communication signal, the wireless communication device comprising:
a base material;
an antenna pattern disposed on the base material;
a feeding circuit connected to the antenna pattern; and
an ignition protection member disposed on at least one of the base material and the antenna pattern,
wherein the ignition protection member contains moisture, such that ignition protection member is configured to protect the wireless communication device or a product to which the wireless communication device is attached from ignition when heat is applied thereto, and
wherein the moisture of the ignition protection member is configured to vaporize for heat absorption in response to the heat applied to the wireless communication device to protect the wireless communication device or the product to which the wireless communication device from damage caused by the heat.

2. The wireless communication device according to claim 1, wherein the ignition protection member is configured to absorb high-frequency power having a frequency higher than a frequency of the communication signal with higher efficiency than power of the communication signal.

3. The wireless communication device according to claim 2, wherein the high-frequency power is microwave power used for electromagnetic wave heating ranging from 2.4 GHz to 2.5 GHz.

4. The wireless communication device according to claim 1, wherein the ignition protection member contains a water absorbing polymer that has absorbed water.

5. The wireless communication device according to claim 1, wherein the ignition protection member contains a hydrogel.

6. The wireless communication device according to claim 1, wherein the ignition protection member covers an entire surface of the antenna pattern.

7. The wireless communication device according to claim 1, wherein the antenna pattern includes a pair of opposing conductor patterns, and the ignition protection member is disposed between the opposing conductor patterns in a plan view thereof.

8. The wireless communication device according to claim 1, wherein the ignition protection member is disposed at a position sandwiching a part of the antenna pattern in a direction along a surface of the base material.

9. The wireless communication device according to claim 1, wherein the ignition protection member is disposed around a region where the antenna pattern is disposed in a plan view thereof.

10. The wireless communication device according to claim 1, wherein the ignition protection member is disposed on a surface of the base material opposite to a surface of the base material on which the antenna pattern is disposed.

11. The wireless communication device according to claim 1, wherein the base material is one of a plurality of insulation sheets defined by a laminate, and the ignition protection member is a bonding material that bonds at least a pair of the plurality of insulation sheets.

12. The wireless communication device according to claim 1, wherein the antenna pattern includes a pair of opposing conductor patterns, with each conductor pattern meandering towards a respective side of the base material.

13. The wireless communication device according to claim 12, wherein the ignition protection member comprises a plurality of ignition protection members that are each disposed between a pair of turns of a meandering shape of the respective conductor pattern.

14. The wireless communication device according to claim 12, wherein the ignition protection member comprises a plurality of ignition protection members that are each disposed outside folded portions of a meandering shape of the respective conductor pattern.

15. A wireless communication device for transmitting and receiving a communication signal, the wireless communication device comprising:
- a base material having a rectangular shape in a plan view thereof with opposing first and second sides;
- an RFIC package disposed on the base material;
- an antenna pattern disposed on the base material and including a pair of meandering conductor patterns connected to the RFIC package and extending in respective directions meandering towards the opposing first sides of the base material, respectively; and
- an ignition protection member containing a moisture and disposed on at least one of the base material and the antenna pattern
- wherein the moisture of the ignition protection member is configured to vaporize for heat absorption in response to heat applied to the wireless communication device to protect the wireless communication device or a product to which the wireless communication device is attached from damage caused by the heat.

16. The wireless communication device according to claim 15, wherein the ignition protection member is configured to protect the wireless communication device or the product to which the wireless communication device is attached from ignition when the heat is applied thereto that vaporizes the moisture.

17. The wireless communication device according to claim 15, wherein the ignition protection member comprises a plurality of ignition protection members that are each disposed between a pair of turns of the respective meandering conductor pattern.

18. The wireless communication device according to claim 15, wherein the ignition protection member comprises a plurality of ignition protection members that are each disposed outside folded portions of the respective meandering conductor pattern.

19. The wireless communication device according to claim 15,
- wherein the ignition protection member is configured to absorb high-frequency power having a frequency higher than a frequency of the communication signal with higher efficiency than power of the communication signal, and
- wherein the high-frequency power is microwave power used for electromagnetic wave heating ranging from 2.4 GHz to 2.5 GHz.

20. The wireless communication device according to claim 15, wherein the ignition protection member covers an entire surface of the antenna pattern.

* * * * *